United States Patent [19]
Takahashi

[11] Patent Number: 6,059,686
[45] Date of Patent: May 9, 2000

[54] SPEED RATIO CONTROL DEVICE OF CONTINUOUSLY VARIABLE TRANSMISSION AND CONTROL METHOD

[75] Inventor: Hiroshi Takahashi, Komae, Japan

[73] Assignee: Nissan Motor Co., Ltd., Yokohama, Japan

[21] Appl. No.: 09/246,849

[22] Filed: Feb. 9, 1999

[30] Foreign Application Priority Data

Feb. 9, 1998 [JP] Japan .................................. 10-027514

[51] Int. Cl.[7] .................................................. B60K 41/12
[52] U.S. Cl. .......................................... 477/47; 477/118
[58] Field of Search .............................. 477/47, 97, 118, 477/903

[56] References Cited

U.S. PATENT DOCUMENTS

| | | | |
|---|---|---|---|
| 4,665,775 | 5/1987 | Nagamatsu et al. ....................... | 477/47 |
| 4,691,812 | 9/1987 | Takizawa ................................. | 192/3.3 |
| 4,916,982 | 4/1990 | Suzuki . | |
| 4,966,049 | 10/1990 | Takahashi ........................... | 477/903 X |
| 5,323,318 | 6/1994 | Hasegawa et al. ....................... | 477/97 |
| 5,428,531 | 6/1995 | Hayafune ................................ | 477/97 |
| 5,542,890 | 8/1996 | Nakano et al. ........................... | 476/10 |
| 5,598,335 | 1/1997 | You ........................................ | 477/97 |
| 5,716,301 | 2/1998 | Wild et al. ............................... | 477/97 |
| 5,803,861 | 9/1998 | Yamamoto ............................... | 476/40 |
| 5,820,514 | 10/1998 | Adachi ..................................... | 477/46 |

FOREIGN PATENT DOCUMENTS

| | | |
|---|---|---|
| 5-3966 | 1/1993 | Japan . |
| 6-199191 | 7/1994 | Japan . |
| 7-108883 | 4/1995 | Japan . |
| 8-194893 | 7/1996 | Japan . |

OTHER PUBLICATIONS

"The Present and Future of ASV," Autom,otive Engineering, Jun. 1996, pp. 38–59.

"Development of Road Surface Conditions Detection Road System," Technical Research Association, Advanced Road Traffic System Group, vol. 5, Mar. 1997, pp. 257–262.

"Research on Road Systems Using the Latest Communication Techniques," Technical Research Associatation, Driving Support Road System Development, vol. 9, Mar. 1997, pp. 33.

*Primary Examiner*—Sherry L. Estremsky
*Attorney, Agent, or Firm*—Foley & Lardner

[57] ABSTRACT

In a vehicle comprising a continuously variable transmission, an engine braking force is increased or decreased via speed ratio control. First, a first target speed ratio is determined based on a vehicle speed. Information relating to vehicle running conditions is acquired, and the first target speed ratio is modified to a second target speed ratio according to this information by controlling the speed ratio of the continuously variable transmission to the second target speed ratio. Hence, the optimum engine braking force is obtained according to the running conditions.

31 Claims, 4 Drawing Sheets

SPEED RATIO CONTROL DEVICE OF CONTINUOUSLY VARIABLE TRANSMISSION AND CONTROL METHOD

FIELD OF THE INVENTION

This invention is related to engine brake control of a vehicle wherein a continuously variable transmission is installed.

BACKGROUND OF THE INVENTION

U.S. Pat. Nos. 5,542,890 and 5,803,861 disclose a toroidal transmission, and U.S. Pat. No. 5,820,514 discloses a V-belt transmission, as continuously variable transmissions for a vehicle wherein a speed ratio is continuously varied. U.S. Pat. No. 4,916,982 also discloses criteria of speed ratio control wherein the speed ratio of these continuously variable transmissions is increased together with the throttle opening of an engine. Herein, speed ratio is defined as the ratio of the rotation speed of the input shaft/rotation speed of the output shaft. Therefore, a larger speed ratio means the rotation speed of the input shaft is higher for the same output shaft rotation speed.

SUMMARY OF THE INVENTION

Applying the above criteria, the speed ratio increases when a driver largely depresses an accelerator pedal to accelerate a vehicle. This is desirable from the viewpoint of obtaining excellent acceleration performance of the vehicle. On the other hand, when the driver detaches his foot from the accelerator pedal to decelerate the vehicle, the throttle opening decreases, the speed ratio decreases accordingly, and engine braking force decreases. The decrease of engine braking force during deceleration increases dependency on the foot brake, and increases the load on the braking device. Moreover, the way in which the engine braking force acts is different from the way in which it acts in a manual transmission, and there is a possibility that the driver may experience some discomfort.

Therefore, criteria which give a desirable speed change characteristic during acceleration do not necessarily give a desirable characteristic during deceleration.

In other words, a single criterion is not sufficient in order to obtain a speed change characteristic which gives optimum running performance in accordance with the driver's intention and running conditions.

It is therefore an object of this invention to optimize engine braking force acting during deceleration of a vehicle using a continuously variable transmission regardless of any limitations on speed change characteristics during acceleration.

In order to achieve the above object, this invention provides a speed ratio control device for controlling a speed ratio of a continuously variable transmission for a vehicle. The vehicle comprises an accelerator pedal which exerts an engine braking force on the vehicle when the accelerator pedal is released from depression, and the control device comprises a sensor for detecting if the accelerator pedal has been released from depression, a sensor for detecting a vehicle speed, a sensor for acquiring information related to a vehicle running condition, and a microprocessor.

The microprocessor is programmed to set a first target speed ratio according to the vehicle speed when the accelerator pedal has been released from depression, correct the first target speed ratio to a second target speed ratio based on the information, and control the speed ratio of the continuously variable transmission to the second target speed ratio.

This invention also proposes a control method of the above continuously variable transmission. The method comprises detecting if the accelerator pedal has been released from depression, detecting a vehicle speed, acquiring information related to a vehicle running condition, setting a first target speed ratio according to the vehicle speed when the accelerator pedal has been released from depression, correcting the first target speed ratio to a second target speed ratio based on the information, and controlling the speed ratio of the continuously variable transmission to the second target speed ratio.

The details as well as other features and advantages of this invention are set forth in the remainder of the specification and are shown in the accompanying drawings.

DESCRIPTION OF THE PREFERRED EMBODIMENTS

Figure 1:
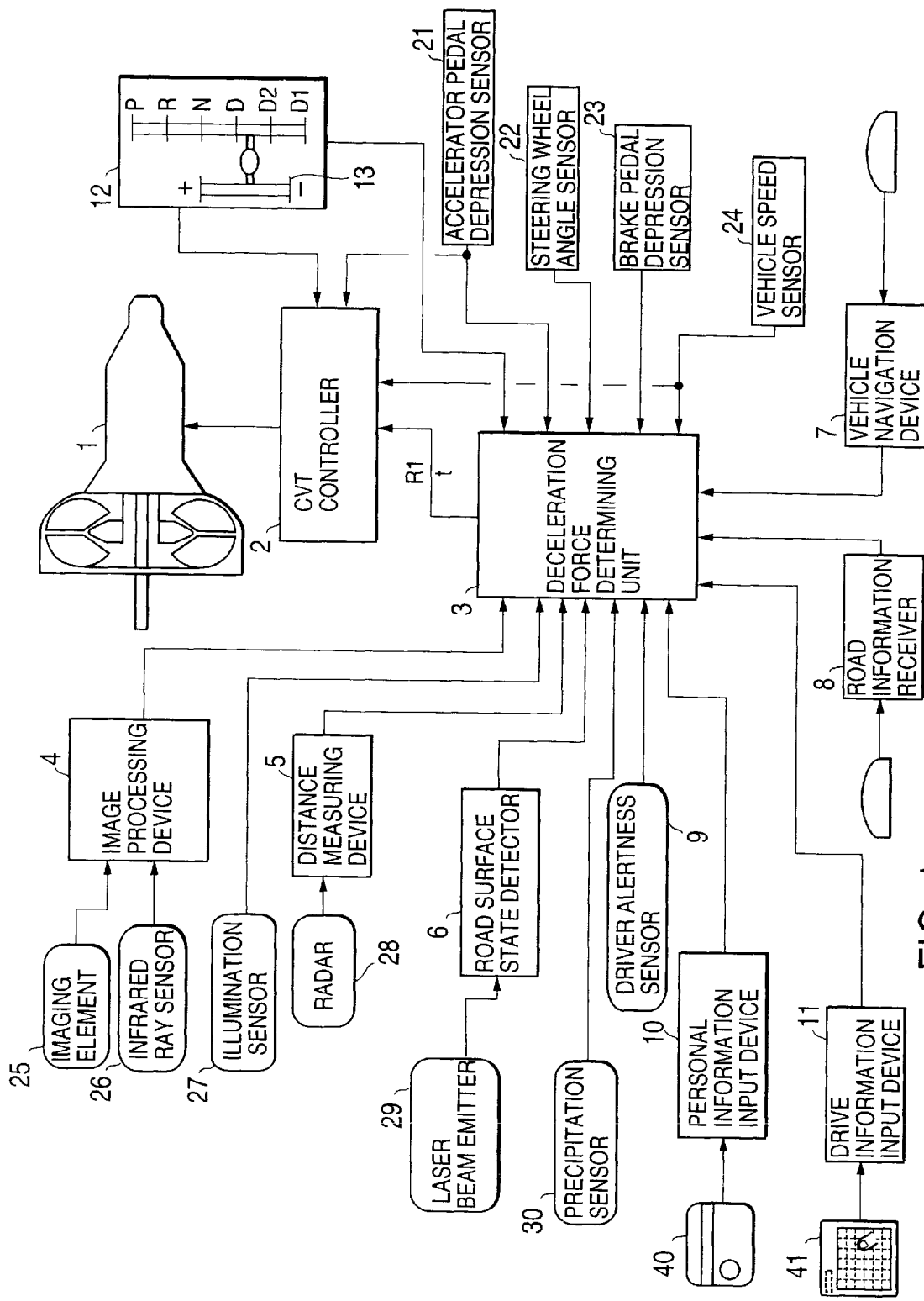
FIG. 1 is a schematic diagram of a control device of a continuously variable transmission (CVT) according to this invention.

Referring to FIG. 1 of the drawings, a toroidal continuously variable transmission 1 varies a speed ratio according to an input signal from a CVT controller 2. The construction of the toroidal continuously variable transmission is well-known from the aforesaid U.S. Pat. Nos. 5,542,890 and 5,803,861. A V-belt continuously variable transmission as disclosed in U.S. Pat. No. 5,820,514 may be used instead of the toroidal continuously variable transmission. The speed ratio is, as described earlier, defined by the rotation speed of the input shaft/rotation speed of the output shaft.

A speed change mode signal from a shift switch 12 which specifies the speed change modes, i.e., automatic, reverse, parking and neutral, selected by the operation of a shift lever, are input to the CVT controller 2. A manual switch 13 which detects the manual mode is attached to the shift switch 12. The manual switch 13 distinguishes the manual mode from other modes, and in the manual mode, inputs a signal which shows increase or decrease of the speed ratio according to the direction of operation of the shift lever, into the CVT controller 2. A signal from a vehicle speed sensor 24 which detects a vehicle speed VSP and an accelerator pedal depression sensor 21 which detects a depression degree ACS of an accelerator pedal are respectively input to the CVT controller 2.

The CVT controller 2 comprises a central processing unit (CPU), random-access memory (RAM), read-only memory (ROM), and an I/O interface.

If the speed change mode is an automatic speed change mode wherein the specified speed change mode corresponds to a so-called drive range, the CVT controller 2 determines a target speed ratio R according to the vehicle speed VSP and accelerator pedal depression degree ACS from the signal input from the shift switch 12.

The speed ratio of the continuously variable transmission 1 is thereby controlled to coincide with the target speed ratio R. This control is well-known from U.S. Pat. No. 4,916,982 of the prior art.

On the other hand, when the specified speed change mode is the manual mode, the speed ratio to be applied is selected from plural preset speed ratios according to input signals upon a signal from the manual switch 13, and is set to the target speed ratio R. The continuously variable transmission 1 is then controlled to achieve the target speed ratio R.

The speed ratio control device according to this invention also comprises a deceleration force determining unit 3. The deceleration force determining unit 3 comprises a microcomputer similar to that of the CVT controller 2, and it is connected to the CVT controller 2. The deceleration force determining unit 3 calculates a first parameter S and a second parameter K to correct the target speed ratio R used by the CVT controller 2 based on various input signals so as to achieve a desirable engine braking force when deceleration is performed. The calculated parameters are then input to the CVT controller 2.

To perform the above calculations, signals are respectively input to the deceleration force determining unit 3 from the following sensors which detect the vehicle running state, road situation, driver's state and environmental conditions.

The vehicle speed VSP detected by the vehicle speed sensor 24 and the accelerator pedal depression degree ACS detected by the accelerator pedal depression sensor 21 are input as signals which show the running state of the vehicle.

A signal from a navigation device 7 is input as a signal which shows the road state to the deceleration force determining unit 3. The navigation device 7 is a well-known position detector which combines a Global Positioning System (GPS) in which a satellite is used, and map information stored in the device.

The detected vehicle position, and width 2A and type 2B of road on which the vehicle is running which are read from the map information, are input to the deceleration force determining unit 3. The road type 2B may be 0 for an expressway for example, and 1 for an ordinary road. Also, a signal 4L which shows if the navigation device 7 is providing route guidance is input to the deceleration force determining unit 3. The value of the signal 4L is set to be 1 when route guidance is provided and 0 when it is not provided.

In addition, the navigation device 7 stores the number of times the vehicle has run on a given road, and inputs the number of times 4M it has run on the road to the deceleration force determining unit 3 regardless of whether or not route guidance is being provided.

The accelerator pedal depression degree ACS, a steering angle STR of the front wheel detected by a steering wheel angle sensor 22, brake depression force BRK detected by a brake pedal depression sensor 23 and a driver alertness detected by a driver alertness sensor 9 are input as signals showing the driver's state.

The brake pedal depression sensor 23 is a sensor which detects the depression force acting on the brake pedal. It is also possible to know the depression force from the oil pressure variation in a brake gear.

The alertness sensor 9 may be a sensor disclosed in "The Present and Future of ASV" (Automotive Engineering, June 1996, published by Tetsudo Nihon Co.). This takes a picture of the face of the driver by a camera provided in the vehicle, and analyzes the opening and shutting pattern of the eyelids from the photographed image. It is a device which distinguishes whether the driver is alert or dozing. The alertness value is set for example to 1 when the driver is alert and to 0 when the driver is dozing. In addition, it is also possible to detect a characteristic running pattern when the driver is dozing while driving from the yaw rate of the vehicle detected from the steering angle STR, vehicle speed VSP, and a yaw rate sensor not shown in the figure.

The deceleration force determining unit 3 calculates the following items relative to the above input signals:

an average value (or dispersion value) 3A of the variation in unit time of the depression degree ACS of the accelerator pedal detected by the accelerator pedal depression sensor 21, an average value (or dispersion value) 3B of the variation in unit time of the steering angle STR detected by the steering angle sensor 22, an average value (or dispersion value) 3C of the variation in unit time of the brake pedal depression force BRK detected by the brake pedal pressure sensor 23, an alertness 3D of driver detected by the alertness sensor 9, a difference 3E between the road speed limit on which the vehicle is running detected by the navigation device 7, and the vehicle speed VSP, an average value 3F of the vehicle speed VSP in unit time detected by the vehicle speed sensor 24, and running time, i.e. an elapsed time 3G since the ignition switch was switched on.

A frictional coefficient 4A of the road while the vehicle is running, detected by a road surface state detector 6, a precipitation signal 4B detected by a precipitation sensor 30 which detects rainfall or snow, an outside illumination 4D detected by an illumination sensor 27, image information from an image processing device 4, inter-vehicle distance 4F from a distance measuring deuce 5, driver information from a personal information input device 10, and information from a drive information input device 11, are input as signals showing environmental conditions to the deceleration force determining unit 3.

The road surface state detector 6 is a detector which irradiates the road in front of the vehicle by a laser beam from a laser beam emitter 29, and detects the smoothness of the road surface, i.e., the frictional coefficient of the road 4A, based on the reflection. As the road surface state detector 6, the device disclosed on pages 257–262 of Volume 5, "Development of Road Surface Conditions Detection Road System", (Technical Research Association, Advanced Road Traffic System Group, Civil Engineering Research Laboratories of Ministry of Construction, Driving Support Road System Development Research Report for Fiscal 1996, published in March 1997), may be used.

The precipitation sensor 30 may comprise for example a wiper switch and a temperature sensor which detects the outside air temperature, with which the vehicle is provided. When the wiper switch is ON a rain state is detected, and when the outside air temperature is equal to or less than a predetermined value, a snow state is detected. A water drop sensor which detects the adhesion of water drops to the vehicle body may be used instead of the wiper switch. However, in this embodiment, as no distinction is made between rain and snow for determining the deceleration force, rain and snow are combined into one precipitation signal 4B.

An imaging element 25 and infrared ray sensor 26 are connected to the image processing device 4. The image processing device 4 detects an outline of various objects which appear in the image photographed in front of the vehicle by imaging element 25 by using a differential filter such as a linear first order spatial differential filter, and calculates a total length 4G of the line forming the outline. Alternatively, the outline may be divided into vertical lines and horizontal lines, and the total number of lines calculated. These values are used as values showing the congestion of the road. As the imaging element 25, a charge-coupled device (CCD) 25 may be used.

The image processing device 4 also calculates a total area 4I in a high brightness part, i.e., a part where the brightness exceeds a predetermined value, from the image in front of the vehicle detected by the infrared ray sensor 26. A standard deviation 4H of brightness distribution is also calculated. A brightness average value may be used instead of the standard deviation.

The image processing device 4 outputs the total length 4G of the lines forming the outline, total area 4I of the parts where the brightness exceeds the predetermined value and standard deviation 4H of the brightness distribution, calculated as described above, to the deceleration force determining unit 3.

The distance measuring device 5 detects the spacing 4F from other vehicles in front by using a radar 28. As the radar 28, a millimeterwave radar or a laser radar may be used.

The personal information input device 10 reads an IC card 40 which the driver carries, and outputs a driving experience 4J based on accumulated mileage or number of years of driving experience to the deceleration force determining unit 3. An input device using an IC card for controlling a vehicle is known from Tokkai Hei 7-108883 issued in 1995, Tokkai Hei 6-199191 issued in 1994 and Tokkai Hei 5-3966 issued in 1993 by the Japanese Patent Office.

A drive information input device 11 is a device wherein the driver inputs the number of passengers 4K via a touch panel 4I. Information such as preferences concerning the force of the engine brake may also be input into this device 11. The drive information input device 11 then outputs the number of passengers 4K to the deceleration force determining unit 3.

The deceleration force determining unit 3 calculates a variation 4E in unit time of the illumination 4D outside the vehicle detected by the illumination sensor 27.

Figure 2:
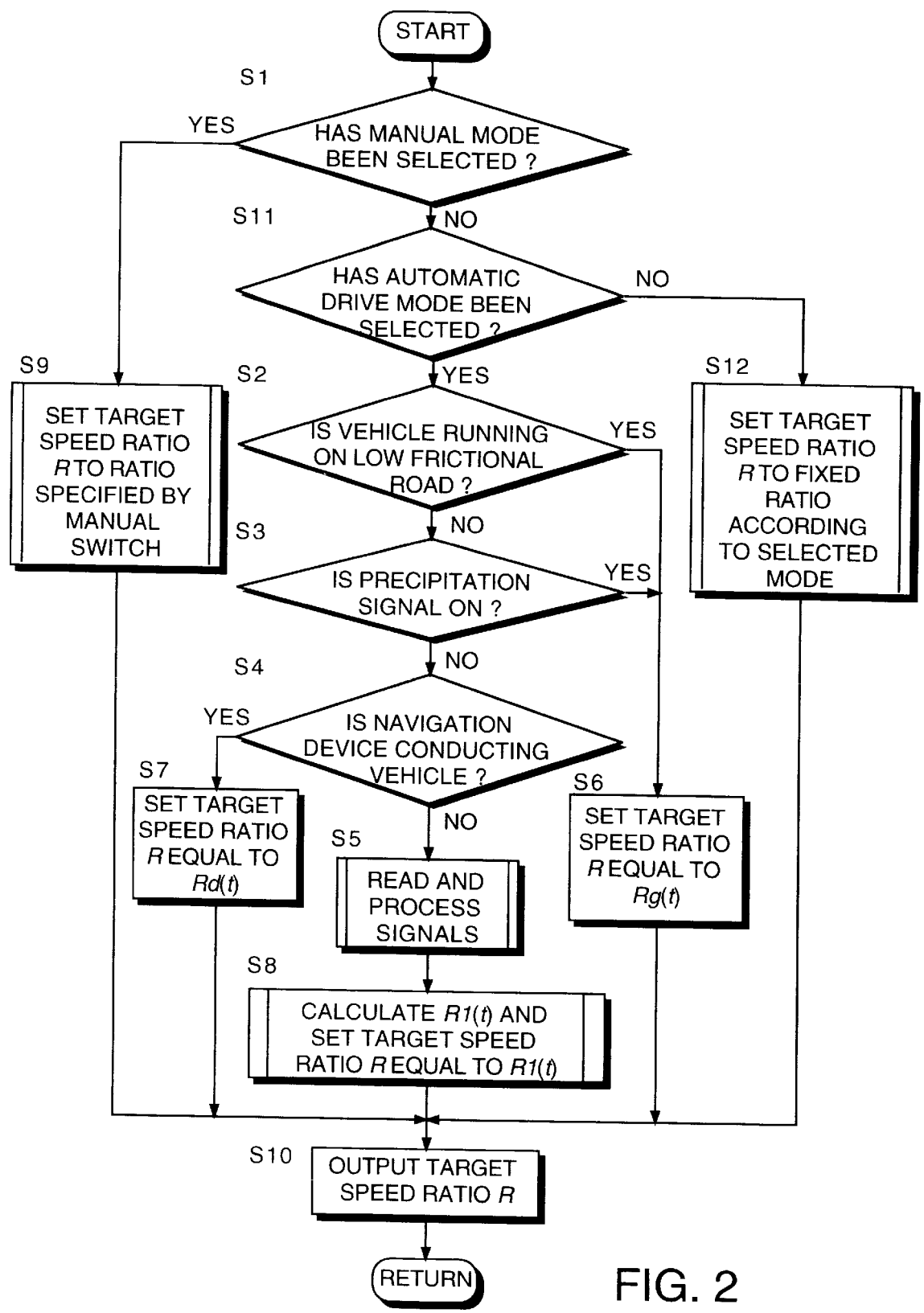
FIG. 2 is a flowchart describing an engine brake control process performed by a CVT controller according to this invention.

Next, referring to FIG. 2, the speed ratio control routine performed using the aforesaid data by the control unit 2 and deceleration force determining unit 3 will be described. This routine is performed in a fixed interval, for example every 10 milliseconds, when the accelerator pedal depression degree ACS is 0/8, i.e., when the accelerator pedal is released.

First, in a step S1, it is determined whether or not the manual mode is selected based on an input signal from the manual switch 13. When the manual mode has been selected, the routine proceeds to a step S9, and the target speed ratio R corresponding to the speed ratio specified by the manual switch 13 is set.

In a step S10, these values are output to the continuously variable transmissions 1, and the routine is terminated.

When it is determined that the manual mode has not been selected in the step S1, it is determined whether or not the automatic drive mode is selected based on the input signal from the shift switch 12 in a step S11.

When any other mode, i.e., the parking, reverse or neutral mode has been selected, the routine proceeds to the step S12. Here, the target speed change ratio R is given a fixed value depending on the mode. Subsequently, the target speed change ratio R is output to the continuously variable transmission 1 in the step S10, and the routine is terminated.

In the parking and neutral modes, the rotation torque of the engine is not input to the continuously variable transmission 1, so in this case the target speed ratio R need not be set. In this case, in the step S12, R maintains the value it had on the immediately preceding occasion.

When it is determined that the automatic drive mode has been selected in the step S11, the routine proceeds to a step S2.

Here, it is determined whether or not the road on which the vehicle is running is a low frictional road based on the road surface frictional coefficient 4A. Specifically, when the road frictional coefficient 4A is less than a predetermined value, it is determined that the road is a low friction road.

When the road is determined as a low friction road, the routine proceeds to a step S6.

On the other hand, when it is determined that the road is not a low friction road, it is determined whether or not the precipitation signal 4B is ON in a step S3, and when it is determined that this signal is ON, the routine proceeds to the step S6.

Figure 5:
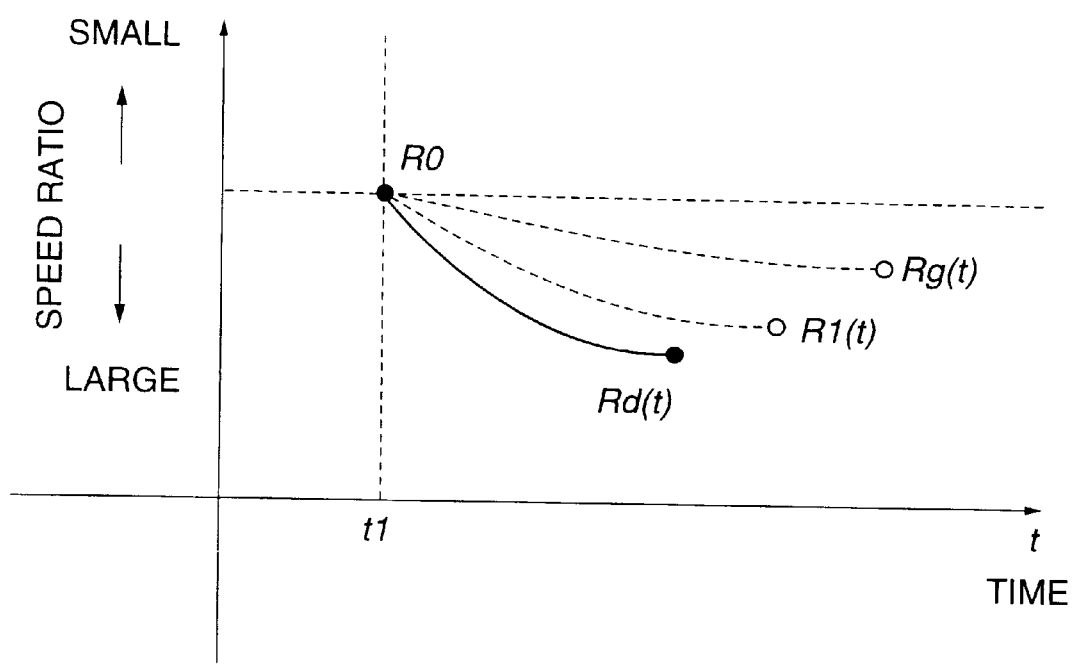
FIG. 5 is a diagram showing a time change in a speed ratio when the engine brake acts under speed ratio control due to the CVT controller.

The speed ratio during deceleration under the engine brake increases according to the decrease in the vehicle speed. In this invention, as shown in FIG. 5, a variation characteristic of this speed ratio is set within a range from a characteristic Rd(t) which gives strong engine braking where the rate of increase of the speed ratio is high relative to time and the maximum speed ratio finally attained is high, and a characteristic Rg(t) which gives weak engine braking where the rate of increase of the speed ratio is low relative to time and the maximum speed ratio finally attained is low.

In the step S6, the target speed ratio R is set to Rg(t) which corresponds to the weak engine braking characteristic.

After setting the target speed change ratio R in the step S6, this value is output to the CVT controller 2 in a step S10, and the routine is terminated.

Due to the setting of the step S6, the engine brakes have the weakest characteristics in the setting range. Thus, the drive wheels are prevented from slipping on a road with a low coefficient of friction, when it is snowing and when it is raining.

On the other hand, when the precipitation signal 4B is not switched ON in the step S3, the routine proceeds to the step S4, and it is determined whether or not the navigation device 7 is providing route guidance.

When the navigation device 7 is providing route guidance, it can be presumed that the driver is driving on a road on which he is inexperienced.

In such a running environment, as the state of the road in front of the vehicle cannot be foreseen, it is desirable that the engine brake acts swiftly and powerfully when the accelerator pedal is released.

Hence, when the navigation device 7 provides route guidance, the routine proceeds to a step S7. In the step S7, the target speed ratio R is set to the aforesaid Rd(t).

After the target speed ratio R thus set is output to the control unit 2 in the step S11, the routine is terminated. Due to the setting of the step S7, the engine brake acts rapidly and powerfully on the drive wheels.

When it is determined that the navigation device 7 is not providing route guidance in the step S4, the routine proceeds to a step S5. Here, various input signals are read, and the aforesaid data which is necessary to determining the target speed ratio R1(t) is calculated.

In a step S8, the target speed ratio R1(t) is determined by the next equation (1) using the aforesaid input signals and data.

$$R1(t)=Rd(t)-\{R0-Rg(t)-Rd(t)\}\cdot(1-S)\cdot(e^{\{-K(t-t1)\}}-1) \quad (1)$$

where, t=present time, t1=engine brake start time,

Rg(t)=target speed ratio at time t when weakest engine brake characteristics are applied, R0=speed ratio when engine brake starts, Rd(t)=target speed ratio at time t when strong engine brake characteristics are applied, S=first parameter, and K=second parameter.

The deceleration force determining unit 3 calculates the aforesaid first parameter S in the above equation based on the input signals and data by the following equation (2).

$$S=fa\cdot fb \quad (2)$$

where, fa=increase function, and fb=decrease function.

Figure 3:
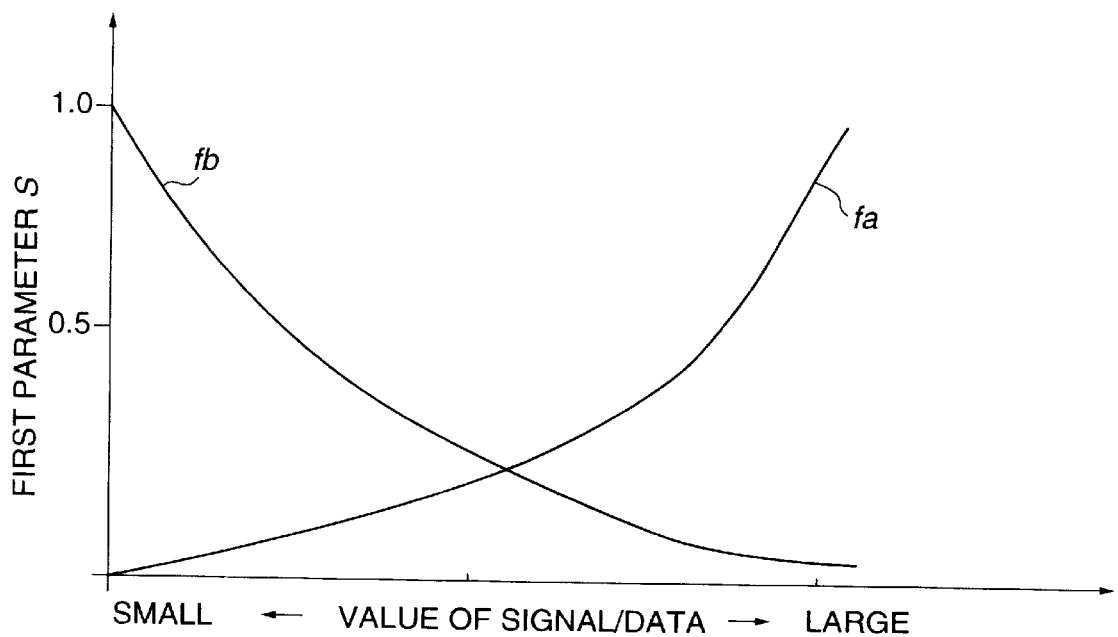
FIG. 3 is a diagram showing a relation between a first parameter S, signal value and a determination value according to this invention.

The relation between the increase function fa, decrease function fb and first parameter S is shown in FIG. 3.

The increase function fa is determined based on either the following signals or data.

2B: Type of road

3A: Average value of variation of depression degree ACS of accelerator pedal in unit time 3B: Average value of variation of steering angle STR in unit time 3C: Average value of variation of brake pedal depression force BRK 3E: Difference between road speed limit and vehicle speed VSP 3G: Running time 4E: Variation of illumination outside vehicle 4G: Total length of outline of object in image from imaging element 4H: Standard deviation of brightness distribution of image in front of vehicle from imaging element 4I: Total area of high brightness part in image in front of vehicle due to infrared rays The decrease function fb is determined based on either the following signals or data.

2A: Width of road

3D: Alertness of driver

3F: Average value of vehicle speed VSP

4D: Illumination outside vehicle

4F: Distance to vehicle in front

4J: Driving experience of driver

4K: Number of passengers

4M: Number of times vehicle has run on road

When the first parameter S is determined using plural signals and data, the average value, dispersion value or standard deviation of the first parameter S is calculated according to individual signals and data.

Further, the deceleration determining unit 3 calculates the second parameter K in the above equation (1) by the following equation (3) based on the aforesaid input signals and data calculated in the step S7.

$$K=ta\cdot tb \quad (3)$$

where, ta=increase function, and tb=decrease function.

Figure 4:
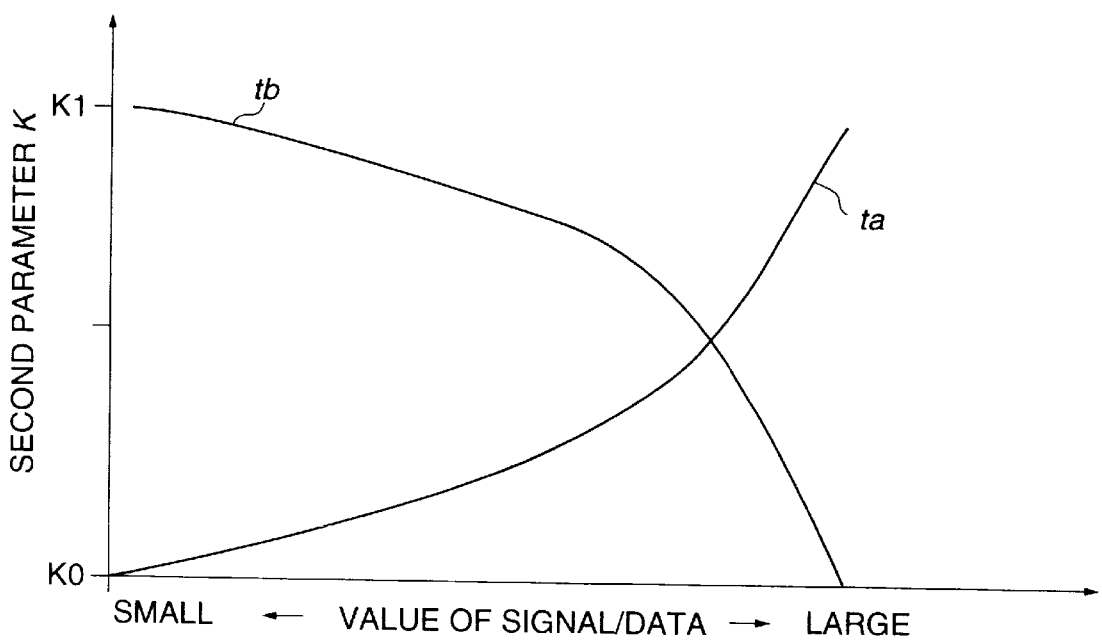
FIG. 4 is a diagram showing a relation between a second parameter KS, signal value and determination value according to this invention.

The relation between the increase function ta, decrease function tb and second parameter K is shown in FIG. 4.

The increase function ta is determined based on either the following signals or data.

2A: Width of road

3D: Alertness of driver

4D: Illumination outside vehicle

3F: Average value of vehicle speed VSP

4F: Distance to vehicle in front

4J: Driving experience of driver

4K: Number of passengers

4M: Number of times vehicle has run on road

The decrease function tb is determined based on either the following signals or data.

2B: Type of road

3A: Average value of variation of depression degree ACS of accelerator pedal in unit time 3B: Average value of variation of steering angle STR in unit time 3C: Average value of brake pedal pressure BRK in unit time 3E: Difference between road speed limit and vehicle speed VSP 3G: Running time 4E: Variation 4E of illumination 4D outside vehicle in unit time 4G: Total length of outline of image in front of vehicle from imaging element 4H: Standard deviation of brightness distribution of image in front of vehicle from imaging element 4I: Total area of high brightness part in front of vehicle due to infrared rays When the second parameter K is determined using plural signals and data, the average value, dispersion value or standard deviation of the second parameter K is calculated according to individual signals and data.

In the step S10, the target speed ratio R=R1(t) thus calculated is output to the control unit 2 and the routine is terminated.

Here, the effect which this exerts on the engine braking force will be described taking the average value 3A of the variation of the depression degree ACS of the accelerator pedal in unit time as an example.

The increase function fa is set in a step S8 based on the average value 3A calculated in the step S5. If the average value 3A is large, the first parameter S increases and approaches 1. If the average value 3A is small, the first parameter S decreases and approaches 0.

From FIG. 5, R0<Rg(t), Rd(t), t>t1 and from Equation (3) and FIG. 4, K>0. Therefore, the target speed ratio R1(t) increases the larger the first parameter S in Equation (1). Similarly, the target speed ratio R1(t) increases the smaller the second parameter K.

The average value 3A of the depression degree ACS of the accelerator pedal increases when the acceleration/deceleration is large, as for example on congested roads and mountain roads. In this case, the engine brake is reinforced by setting the target speed ratio R1(t) to a large value.

On the other hand, when the average value 3A is large, the deceleration function tb decreases and approaches 0. The second parameter K therefore becomes small, and the target speed ratio R1(t) increases as a result.

Therefore, when the average value 3A of the depression degree ACS of the accelerator pedal is large, a strong engine brake is applied.

Next, the relations between signals, data, and first and second parameters S, K will be described.

2A: Width of road

When the width of road 2A detected by the navigation device 7 is large, the driver can maintain wide a field of view and altering the lane is easy when the vehicle encounters a hazardous situation. In this case, therefore, the first parameter S is set small via the decrease function fb, and the second parameter K is set larger via the increase function ta so as to reduce the engine braking force.

2B: Type of road

On an expressway (2B=0), in general, the vehicle speed VSP is large. The first parameter S is therefore set small via the increase function fa, and the second parameter K is made large via the decrease function tb, whereby the engine braking force is reduced.

Conversely, on an ordinary road (2B=1), the first parameter S is set large and the second parameter K is set small, whereby the engine braking force is increased.

3B: Variation of steering angle

When the variation 3B of the steering angle is large, as when the variation amount 3A of the accelerator depression degree ACS is large, it may be assumed that acceleration/deceleration is large as on congested roads or mountain roads. In this case, the first parameter S is set large via the increase function fa and the second parameter K is set small via the decrease function tb so as to increase the engine braking force.

3C: Variation of brake pedal pressure

When the variation 3C of brake pedal pressure is large, it may be assumed that acceleration/deceleration is large as on congested roads or mountain roads. In this case also, the first parameter is set large via the increase function fa and the second parameter K is set small via the decrease function tb so as to increase the engine braking force.

3D: Alertness

When the alertness of the driver is low (3D=0), it is determined that the driver is dozing. In this case, the first parameter S is set large via the increase function fa and the second parameter K is set small via the decrease function tb so as to increase the engine braking force. Alertness is encouraged by means of a large deceleration force.

3E: Difference between road speed limit and vehicle speed VSP

When the present vehicle speed VSP largely surpasses the speed limit of the road, the engine braking force is increased by setting the first parameter S large via the increase function fa and by setting the second parameter K small via the decrease function tb. On the other hand, when this difference is in the vicinity of 0 or is negative, the engine braking force is decreased.

3F: Average value of vehicle speed VSP

When the vehicle speed VSP is high, the engine braking force is decreased by reducing the first parameter S via the decrease function fb and the second parameter K is increased via the increase function ta.

3G: Running time.

When the elapsed time after the ignition key is switched ON increases, it is assumed that the fatigue of the driver also increases. In this case, the engine braking force is increased by increasing the first parameter S via the increase function fa and by reducing the second parameter K via the decrease function tb.

4D: Illumination

When the illumination outside the vehicle is high, it is determined that the vehicle is being driven during the daytime or in a brightly lit environment. In this case, the engine braking force is decreased by reducing the first parameter S via the decrease function fb and by increasing the second parameter K via the increase function ta. At nighttime when the illumination decreases, the driver has a tendency to drive more carefully as his field of view is narrower even on the same road. In this case, the engine braking force is increased by increasing the first parameter S and by decreasing the second parameter K.

4E: Variation of illumination

When the variation of illumination outside the vehicle is large, it is determined that the vehicle is being driven in a tunnel, for example. In a tunnel, the driver tends to drive more carefully. In this case, the engine braking force is increased by increasing the first parameter S via the increase function fa and by reducing the second parameter K via the decrease function tb.

4F: Inter-vehicle distance

When the inter-vehicle distance is small, it is determined that the vehicle is being driven on a congested road or in a traffic jam, etc. In this case, the engine braking force is increased by increasing the first parameter S via the decrease function fb and by reducing the second parameter K via the increase function ta.

4G: Total length of outline of object in image in front of vehicle from imaging element If there are large number of outlines, it indicates a large number of objects and congestion factors on the road such as vehicles, bicycles, pedestrian and parked vehicles, signs and buildings. In this case, the engine braking force is increased by setting a large first parameter S via the increase function fa and by reducing the second parameter K via the decrease function tb. Conversely, when there are few outlines, it is determined that the congestion of the road is low. In this case, the engine braking force is decreased by decreasing the first parameter S and by increasing the second parameter K.

Instead of number of outlines, the total length of vertical lines and horizontal lines comprising the outline may be calculated, and the congestion determined to be higher the longer the total length of these lines.

4H. Standard deviation of image brightness in front of vehicle from imaging element As in the case of the number of outlines in the image, the standard deviation of the brightness detected from the image in front of the vehicle increases as the number of objects increases. Therefore, when the brightness standard deviation is large, the engine braking force is increased by setting a large first parameter S via the increase function fa and by setting a small second parameter K via the decrease function tb. Conversely, as there are few congestion factors on the road in front of the vehicle when the standard deviation of brightness is small, the engine braking force is decreased by decreasing the first parameter S and by increasing the second parameter K.

4H: Average brightness value of image in front of vehicle from imaging element

It is also possible to apply this parameter 4H instead of the standard deviation 4H of image brightness. When the number of objects in front of the vehicle increases, the average brightness value of the image in front of the vehicle tends to decrease. The increase in the number of objects in front of the vehicle means an increase in the congestion degree of the road. Hence, when the average brightness value is small, it is determined that the vehicle is running on a congested road, and the engine braking force is increased by setting a large first parameter S via the decrease function fb and by setting a small second parameter K via the increase function ta.

Conversely, when the average brightness value is large, it is determined that there are few congestion factors on the road in front of the vehicle, the engine braking force is decreased by setting the first parameter S small and by setting the second parameter K large.

4I: Total area of high brightness part of image in front of vehicle from infrared ray sensor When the number of objects increases, the total area of a high brightness part of the image in front of vehicle detected by the infrared ray sensor 26 has a tendency to increase. Therefore, when the total area 4I of the high brightness part is large, the engine braking force is increased by increasing the first parameter S via the increase function fa and by decreasing the second parameter K via the decrease function tb.

Conversely, when the high brightness partial total area is small, it is determined that there are few congestion factors on the road. In this case, the engine braking force is decreased by decreasing the first parameter S and by increasing the second parameter K.

Herein, all the image processing of 4G–4I is performed to detect the degree of congestion of the road in front of the vehicle. For example, when the number of vehicles and bicycles on the road in front of the vehicle increases, the congestion also increases, and on a road where there is no clear distinction between the road and the pavement, the congestion increases together with the number of parked vehicles and pedestrians. In addition, there are a large number of objects in the field of vision in front of the vehicle when there are many intersections, signs or bends in the road, and these also increase the degree of congestion.

When a large number of these congestion factors are present, for the above signal 4G, the number of outlines or vertical and horizontal lines increases, and for the signal 4H, the standard deviation of brightness increases. Also, the average brightness value decreases, and for the signal 4I, the total area of the high brightness part due to infrared rays increases.

The deceleration force determining unit 3 determines the degree of congestion has increased from the variation of these values.

4J: Driving experience of driver

When the driving experience of the driver is short, the engine braking force is increased by increasing the first parameter S via the decrease function fb and by decreasing the second parameter K via the increase function ta.

4K: Number of passengers

When the number of passengers increases, the behavior of the vehicle is not very smooth when there is a large acceleration/deceleration. Therefore, when there is a large number of passengers, the engine braking force is decreased by reducing the first parameter S via the decrease function fb and by increasing the second parameter K via the increase function ta.

4M: Number of runs on road

On a familiar road on which the vehicle has been driven many times, the engine braking force is decreased by reducing the first parameter S via the decrease function fb and by increasing the second parameter K via the increase function ta.

On the other hand, on a road on which the vehicle has been driven only a few times or is being driven for the first time, the engine braking force is increased by setting the first parameter S large and by setting the second parameter K small.

Hence, optimum engine braking characteristics can be obtained according to the vehicle running state, road conditions and driving conditions.

Although the invention has been described above by reference to certain embodiments of the invention, the invention is not limited to the embodiments described above. Modifications and variations of the embodiments described above will occur to those skilled in the art, in light of the above teachings.

For example, instead of determining the road frictional coefficient 4A based on data detected by the road surface state detector 6, this information may be based on information received by a road information receiver 8. The road information receiver 8 is a device which receives traffic information data broadcasts on the FM frequency band which has already been put to practical use in Japan under the name Vehicle Information and Communication Service (VICS), and enables the driver to obtain information regarding traffic jams and ice on roads on which he intends to drive. Also, it is possible to apply the Beacon/LCX (leakage coaxial cable) disclosed on page 33, Volume 9 of "Research on Road Systems using the Latest Communication Techniques" (Driving Support Road System Development, Technical Research Association, Advanced Road Traffic System Group, Civil Engineering Research Laboratories of Ministry of Construction, Driving Support Road System Development Research Report for Fiscal 1996, published in March, 1997).

The embodiments of this invention in which an exclusive property or privilege is claimed are defined as follows.

What is claimed:

1. A speed ratio control device for controlling a speed ratio of a continuously variable transmission for a vehicle, said vehicle having an accelerator pedal, and an engine braking force being exerted on said vehicle when said accelerator pedal is released from depression, said device comprising:

a sensor for detecting if said accelerator pedal has been released from depression;

a sensor for detecting a vehicle speed;

a sensor for acquiring information related to a vehicle running condition; and a microprocessor programmed to:

set a first target speed ratio according to a vehicle speed when said accelerator pedal has been released from depression, increase said first target speed ratio according to the elapsed time after said accelerator pedal was released from depression.

correct said first target speed ratio to a second target speed ratio based on said information, and control said speed ratio of said continuously variable transmission to said second target speed ratio.

2. A speed ratio control device as defined in claim 1, wherein said microprocessor is further programmed to set said first target speed ratio to a maximum value which can be set with respect to the vehicle speed, and calculate said second target speed ratio by decreasing said first target speed ratio based on said information.

3. A speed ratio control device as defined in claim 1, wherein said information acquiring sensor comprises a sensor for detecting a depression degree of said accelerator pedal, and said microprocessor is further programmed to calculate an average value of a variation amount of said accelerator pedal depression degree in unit time, and increase said second target speed ratio the larger said average value.

4. A speed ratio control device as defined in claim 1, wherein said vehicle comprises a brake pedal, said information acquiring sensor comprises a sensor for detecting said brake pedal depression degree, and said microprocessor is further programmed to calculate a variation amount of said brake pedal depression degree, and increase said second target speed ratio the larger said variation amount.

5. A speed ratio control device as defined in claim 1, wherein said information acquiring sensor comprises a sensor for detecting a steering angle of said vehicle, and said microprocessor is further programmed to calculate a variation amount of said steering angle, and increase said second target speed ratio the larger said variation amount.

6. A speed ratio control device as defined in claim 1, wherein said information acquiring sensor comprises a sensor for detecting an illumination outside said vehicle, and said microprocessor is further programmed to increase said second target speed ratio the lower said illumination.

7. A speed ratio control device as defined in claim 1, wherein said information acquiring sensor comprises a sensor for detecting an illumination outside said vehicle, and said microprocessor is further programmed to calculate a variation of said illumination, and increase said second target speed ratio the larger said variation.

8. A speed ratio control device as defined in claim 1, wherein said information acquiring sensor comprises a sensor for detecting a frictional coefficient of a road on which said vehicle is running, and decrease said second target speed ratio the smaller said road frictional coefficient.

9. A speed ratio control device as defined in claim 1, wherein said information acquiring sensor comprises a sensor for detecting precipitation, and said microprocessor is further programmed to decrease said second target speed ratio when precipitation is detected.

10. A speed ratio control device as defined in claim 1, wherein said information acquiring sensor comprises a sensor for detecting a number of passengers in said vehicle, and said microprocessor is further programmed to decrease said second target speed ratio the larger said number of passengers.

11. A speed ratio control device as defined in claim 1, wherein said information acquiring sensor comprises a navigation device for guiding said vehicle on a road based on an accumulated information, and said microprocessor is further programmed to determine whether or not said navigation device is guiding said vehicle, and set said second target speed ratio equal to said first target speed ratio when said device is guiding said vehicle.

12. A speed ratio control device as defined in claim 1, wherein said information acquiring sensor comprises a navigation device for guiding said vehicle on a road based on an accumulated information, and said microprocessor is further programmed to determine a width of the road on which said vehicle is running based on the information from said navigation device, and increase said second target speed ratio the narrower said width of road.

13. A speed ratio control device as defined in claim 1, wherein said information acquiring sensor comprises a navigation device for guiding said vehicle on a road based on an accumulated information, and said microprocessor is further programmed to determine whether or not the road on which said vehicle is running is an expressway, and decrease said second target speed ratio relative to said first target speed ratio when said road is an expressway.

14. A speed ratio control device as defined in claim 1, wherein said information acquiring sensor comprises a navigation device for guiding said vehicle on a road based on an accumulated information, and said microprocessor is further programmed to determine the number of times on which said vehicle has run on said road based on the information from said navigation device, and increase said second target speed ratio the less said number of times.

15. A speed ratio control device as defined in claim 1, wherein said information acquiring sensor comprises said vehicle speed sensor, and said microprocessor is further programmed to calculate an average value per unit time of said vehicle speed, and increase said second target speed ratio the smaller said average value.

16. A speed ratio control device as defined in claim 1, wherein said information acquiring sensor comprises a navigation device for guiding said vehicle on a road based on an accumulated information, and said microprocessor is further programmed to detect a speed limit of the road on which the vehicle is running based on the information from said navigation device, and increase said second target speed ratio as the vehicle speed surpasses said speed limit.

17. A speed ratio control device as defined in claim 1, wherein said information acquiring sensor comprises a device for inputting a driving experience of a driver of said vehicle, and said microprocessor is further programmed to increase said second target speed ratio the less the driving experience of the driver.

18. A speed ratio control device as defined in claim 1, wherein said information acquiring sensor comprises a sensor for detecting an alertness of a driver of said vehicle, and said microprocessor is further programmed to increase said second target speed ratio the lower said alertness.

19. A speed ratio control device as defined in claim 1, wherein said information acquiring sensor comprises a timer for measuring an elapsed time after said vehicle begins running, and said microprocessor is further programmed to increase said second target speed ratio the longer said elapsed time.

20. A speed ratio control device as defined in claim 1, wherein said information acquiring sensor comprises a sensor for detecting an inter-vehicle distance between said vehicle and a vehicle in front, and said microprocessor is further programmed to increase said second target speed ratio the shorter said inter-vehicle distance.

21. A speed ratio control device as defined in claim 1, wherein said information acquiring sensor comprises an infrared ray sensor for detecting a scenery in front of said vehicle, and said microprocessor is further programmed to calculate a total area of a high brightness part of an image detected by said infrared ray sensor, and increase said second target speed ratio the larger said total area.

22. A speed ratio control device as defined in claim 1, wherein said microprocessor is further programmed to set said first target speed ratio to a maximum value which can be set with respect to the vehicle speed, and calculate said second target speed ratio by decreasing said first target speed ratio based on said information.

23. A speed ratio control device as defined in claim 22, wherein said microprocessor is further programmed to calculate said second target speed ratio by the following equation:

$$R1(t) = Rd(t) - \{R0 - Rg(t) - Rd(t)\} \cdot (1-S)\{e^{(-K \cdot (t-t1))} - 1\}$$

where,

R1(t)=said second target speed ratio, t=a present time, t1=a time at which accelerator pedal was released from depression, Rd(t)=said first target speed ratio, Rg(t)=a preset speed ratio smaller than said first target speed ratio Rd(t), S=a first parameter, where $0 \leq S \leq 1$, and K=a second parameter, where $0 \leq K$.

24. A speed ratio control device as defined in claim 23, wherein said microprocessor is further programmed to vary said first parameter S and second parameter K based on said information.

25. A speed ratio control device as defined in claim 1, wherein said information acquiring sensor comprises an imaging device for photographing a scenery in front of said vehicle, and said microprocessor is further programmed to determine a degree of congestion of a road from an image photographed by said imaging device, and increase said second target speed ratio the higher said degree of congestion.

26. A speed ratio control device as defined in claim 25, wherein said microprocessor is further programmed to calculate a standard deviation of a brightness distribution of said image, and determine that said degree of congestion is higher the larger said standard deviation.

27. A speed ratio control device as defined in claim 25, wherein said microprocessor is further programmed to calculate an average value of a brightness of the image, and determine that said degree of congestion is higher the smaller said average value.

28. A speed ratio control device as defined in claim 25, wherein said microprocessor is further programmed to detect a number of outlines of objects displayed in the image, and determine that said degree of congestion is higher the larger said number of outlines.

29. A speed ratio control device as defined in claim 25, wherein said microprocessor is further programmed to calculate a total length of vertical lines and horizontal lines comprising outlines of objects displayed in the image, and determine that said degree of congestion is higher the longer said total length.

30. A speed ratio control device for controlling a speed ratio of a continuously variable transmission for a vehicle, said vehicle having an accelerator pedal which exerts an engine braking force on said vehicle when said accelerator pedal is released from depression, said device comprising:

means for detecting if said accelerator pedal has been released from depression;

means for detecting a vehicle speed;

means for acquiring information related to a vehicle running condition;

means for setting a first target speed ratio according to a vehicle speed when said accelerator pedal has been released from depression;

means for increasing said first target speed ratio according to an elapsed time after said accelerator pedal was released from depression;

means for correcting said increased first target speed ratio to a second target speed ratio based on said information; and means for controlling said speed ratio of said continuously variable transmission to said second target speed ratio.

31. A speed ratio control method for controlling a speed ratio of a continuously variable transmission for a vehicle, said vehicle having an accelerator pedal, and an engine braking force being exerted on said vehicle when said accelerator pedal is released from depression, said method comprising:

detecting if said accelerator pedal has been released from depression;

detecting a vehicle speed;

acquiring information related to a vehicle running condition;

setting a first target speed ratio according to a vehicle speed when said accelerator pedal has been released from depression;

increasing said first target speed ratio according to an elapsed time after said accelerator pedal was released from depression;

correcting said increased first target speed ratio to a second target speed ratio based on said information; and controlling said speed ratio of said continuously variable transmission to said second target speed ratio.

* * * * *